US005706515A

United States Patent [19]
Connelly et al.

[11] Patent Number: 5,706,515
[45] Date of Patent: Jan. 6, 1998

[54] SYSTEM AND METHOD FOR IMPLEMENTING AN ATOMIC WAIT FOR NOTIFICATION OPERATION

[75] Inventors: David W. Connelly, Los Altos; Patrick P. Chan, Palo Alto, both of Calif.

[73] Assignee: Sun Microsystems, Inc., Mountain View, Calif.

[21] Appl. No.: 622,517

[22] Filed: Mar. 25, 1996

[51] Int. Cl.[6] ............................................. G06F 9/46
[52] U.S. Cl. .......................... 395/676; 395/677; 395/672; 395/670; 395/726
[58] Field of Search ............................ 395/676, 677, 395/672, 670, 726

[56] References Cited

U.S. PATENT DOCUMENTS

| 5,598,562 | 1/1997 | Cutler et al. | 395/674 |
|---|---|---|---|
| 5,615,326 | 3/1997 | Orton et al. | 395/356 |
| 5,625,821 | 4/1997 | Record et al. | 395/670 |
| 5,630,136 | 5/1997 | Davidson et al. | 395/676 |

*Primary Examiner*—Lucien U. Toplu
*Attorney, Agent, or Firm*—Gary S. Williams; Flehr Hohbach Test Albritton & Herbert LLP

[57] ABSTRACT

In a computer system having a data processing unit, memory, and a multitasking operating system that supports multiple threads of execution in a shared address space, a resource allocation subsystem includes an initialization procedure for initializing monitors, a notify procedure and a wait procedure. Each monitor has an associated event data structure denoting the status of the monitor as Signaled or Unsignaled. Each monitor also stores a waiters value indicating how many threads are waiting on the monitor, a tickets value indicating how many of the threads are to receive notifications, and an epoch counter value. The notify procedure updates any specified monitor to the Signaled status, updates the specified monitor's tickets value to indicate how many waiting threads are to receive notifications, and updates the epoch counter to indicate an epoch value associated with the updating of the specified monitor's status to Signaled. The wait procedure blocks execution of a calling thread until a specified monitor's status is updated to Signaled and the monitor's epoch information indicates an epoch value distinct from the epoch value when the calling thread called the wait procedure. The wait procedure unblocks the calling thread when monitor's tickets value is non-zero, and decrements the tickets value to indicate that the calling thread has consumed one ticket.

14 Claims, 7 Drawing Sheets

SYSTEM AND METHOD FOR IMPLEMENTING AN ATOMIC WAIT FOR NOTIFICATION OPERATION

The present invention relates generally to computer operating system constructs for enabling a thread of execution to block its own operation until a particular event signal occurs, and particularly to a system and method for implementing an atomic operation whereby a thread can atomically request a wait until a particular event signal occurs even though the underlying computer operating system does not provide an atomic "drop mutex and wait for notification" operation.

BACKGROUND OF THE INVENTION

In Sun Microsystems' Java programming language, as well as in other programming environments, it is sometimes necessary for a thread of operation to be able to block its continued operation until it receives a specific notification. It is essential that the "block until notification" operation be "atomic" so that the calling thread drops a previously acquired mutex, associated with a resource the thread is waiting to use, and adds itself to the set of threads waiting for notification as a single atomic operation.

Atomic operation is required so that the block until notification operation of one thread does not interfere with the block until notification operation of any other threads. For example, when multiple threads share a common resource, such as message queue, another thread may be used to control access to that resource through the use of an event object which is signaled whenever there is at least one outstanding request for the resource and the resource is available for use. To coordinate communications or resource sharing between these threads, each "wait" and "notify" operation must be atomic. However, a number of computer operating systems do not provide an atomic "wait until notification" facility.

It is a goal of the present invention to provide a general technique for providing an atomic "drop mutex and wait until notification" facility in any computer system that provides a mutex synchronization facility.

Another object of the present invention is to provide an "atomic drop mutex and wait until notification or timeout" facility in any computer system that provides a mutex synchronization facility.

SUMMARY OF THE INVENTION

In a computer system having a data processing unit, memory, and a multitasking operating system that supports multiple threads of execution in a shared address space, a resource allocation subsystem includes an initialization procedure for initializing monitors, a Notify procedure and a Wait procedure. Each monitor has an associated event data structure denoting the status of the monitor as Signaled or Unsignaled, and an epoch counter value.

The Notify procedure updates any specified monitor to the Signaled status, and updates the epoch counter to indicate an epoch value associated with the updating of the specified monitor's status to Signaled. The wait procedure blocks execution of a calling thread until an associated monitor's status is updated to Signaled and the monitor's epoch information indicates an epoch value distinct from the epoch value when the calling thread called the wait procedure.

In a preferred embodiment, each monitor also stores a waiters value indicating how many threads are waiting on the monitor, and a tickets value indicating how many of the threads are to receive notifications. The Notify procedure updates the specified monitor's tickets value to indicate how many waiting threads are to receive notifications. The Wait procedure unblocks the calling thread when monitor's tickets value is non-zero, and decrements the tickets value to indicate that the calling thread has consumed one ticket.

In the preferred embodiment, the system further includes a NotifyAll procedure that updates any specified monitor's tickets value to equal the number of waiting threads, thereby "issuing" notification tickets for all threads waiting on the specified monitor. A TimedWait procedure is similar to the Wait procedure, except that the calling thread is unblocked either when the TimedWait procedure consumes one ticket, or a specified period of time elapses.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
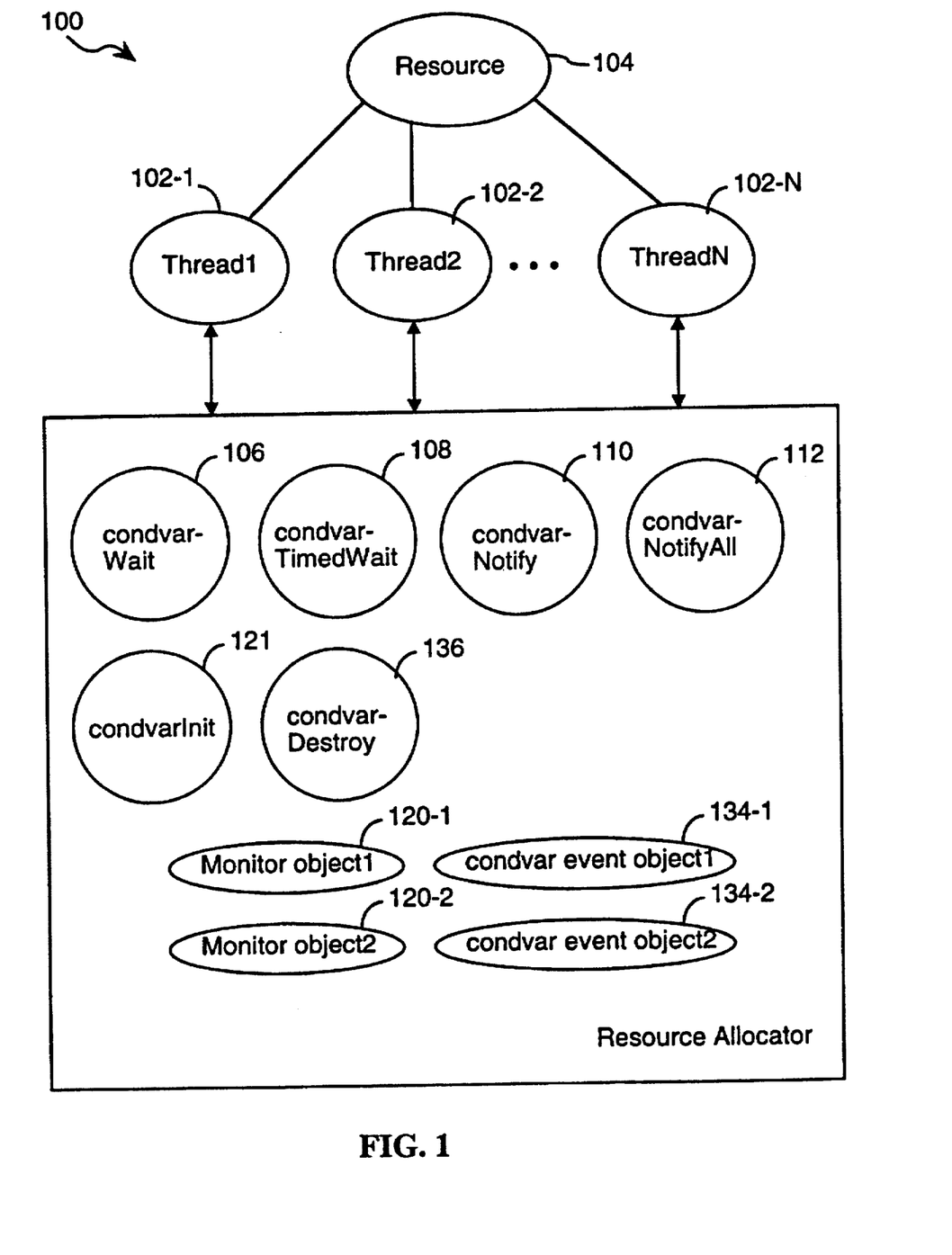
FIG. 1 is a conceptual representation of a system in which multiple threads of operation cooperate in the utilization of a shared resource.
Figure 2:
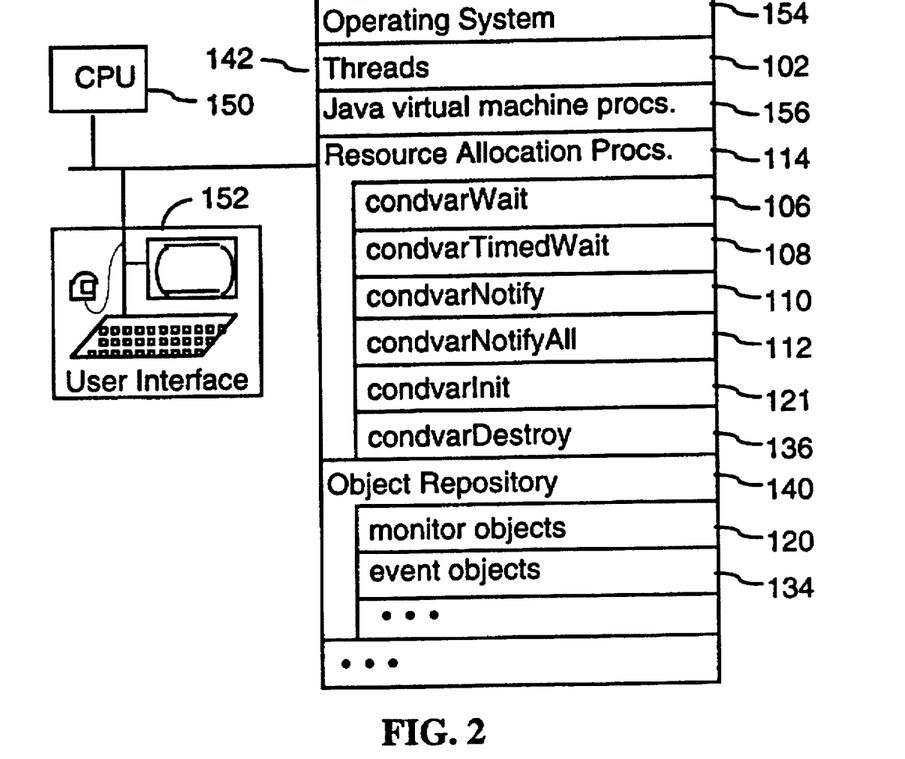
FIG. 2 is a block diagram of a computer system utilizing the Wait and Notify procedures of a preferred embodiment of the present invention.

Referring to FIGS. 1 and 2, there is shown a computer system 100 having multiple threads of execution 102-1 to 102-N that cooperate in the utilization of a shared resource 104. Typically, one of the threads, such as 102-N will be the "keeper" of the resource, while the others are users and potential users of the resource 104. The basic methodology for cooperative utilization is as follows.

There are at least two ways notifications can be used. Notifications can be used to notify requesting threads when a resource is available for use, and notifications can be used to notify requesting threads that a previously submitted task has been processed by the resource. For the purposes of explaining the present invention, we will assume notifications are being used for the former purpose. That is, we will assume that a requesting thread is using the "wait for notification" facility of the present invention in order to wait for a shared resource to be allocated to it, or to wait for a shared resource to become available for use by it and possibly other threads.

In the preferred embodiment of the present invention there are two types of "wait for notification" operations: 1) a Wait operation, which causes the calling thread to be blocked until there is a notification of an associated condition variable event object that is subsequent to the Wait by the calling thread; and 2) a Timed Wait operation, which causes the calling thread to be blocked until either A) there is a notification of an associated condition variable event object that is subsequent to the Timed Wait by the calling thread, or B) a specified amount of time elapses after the Timed Wait by the calling thread. In the figures and Table 1, the procedures for implementing these operations are called condvarWait 106 and condvarTimedWait 108, where the "condvar" prefix indicates that these operations are associated with a "condition variable."

In the preferred embodiment of the present invention there are also two types of notification operations: 1) a simple Notify operation, which causes one calling thread to be notified and thereby unblocked, and 2) a Notify All operation, in which all threads waiting on the associated condition variable event object are notified and thereby unblocked. In the figures and Table 1, the procedures for implementing these operations are called condvarNotify 110 and condvarNotifyAll 112, where the "condvar" prefix indicates that these operations are associated with a "condition variable."

Figure 3:
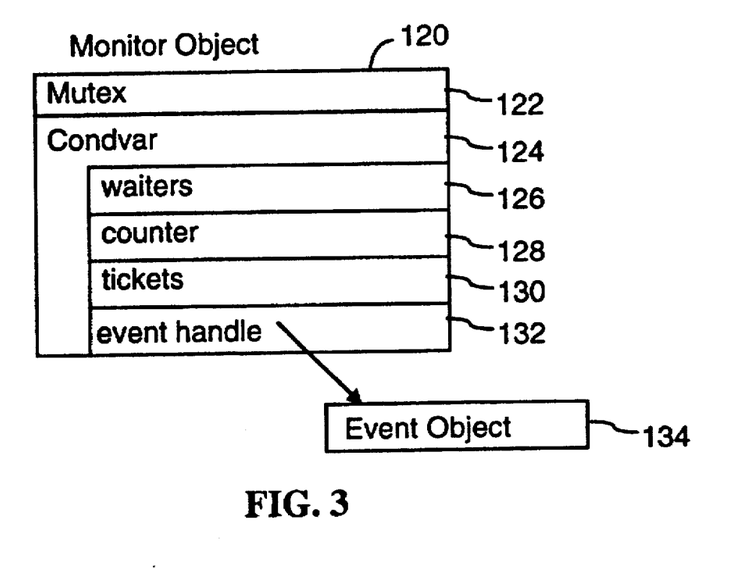
FIG. 3 is a block diagram of a monitor object and condition variable data structure used in a preferred embodiment of the present invention.

For each resource to be allocated, or each distinct portion of a resource that is to be separately allocated, a distinct monitor object 120 needs to be created using a conditional variable initialization procedure 121 called condvarInit. A monitor object 120, as shown in FIG. 3, includes a mutex 122, and a condition variable data structure 124. The condition variable data structure 124 includes a waiters variable 126, a counter variable 128, a tickets variable 130 and a handle 132 or pointer to an associated event object 134. For the purposes of this document, the sole purpose an event object 134 is to store a state value that is equal to either "signaled" or "unsignaled". When the event object's status is Signaled, the associated monitor object is also said to be Signaled, and when event object's status is Unsignaled, the associated monitor object is also said to be Unsignaled. The purpose of the various components of the monitor object 120 will be described in detail below.

Typically, for a shared resource whose use is coordinated through the use of a monitor object, one or more "keeper threads" will call one of the Notification procedures (Notify or Notify All) in order to issue notification tickets to one or more "user threads" that are waiting to use the resource, while the user threads will call one of the Wait procedures (Wait or TimedWait) in order to wait until a notification that the resource is available.

Monitor objects 120, event objects 134, as well other objects are typically stored by the computer system 100 in an object repository 140 in a portion of the computer's memory 142 called a heap (not shown). Monitor objects and their associated event objects are created and initialized through the use of the aforementioned condvarInit procedure 121, and can be deallocated through the use of a condvarDestroy procedure 136.

In the preferred embodiment, the computer system 100 includes a central processing unit (CPU), 150, a user interface 152, and memory 142. Memory 108 stores:

an operating system 154;

the procedures for implementing a Java virtual machine 156;

the resource allocation procedures 158 associated with the preferred embodiment of the present invention; and an object repository 140 for storing objects.

In the preferred embodiment the operating system 154 is an object-oriented multitasking operating system (such as Windows 95 or WindowsNT) that supports multiple threads of execution within each defined address space. The operating system furthermore uses a garbage collection procedure to recover the storage associated with released data structures.

Detailed Description of Wait and Notify Procedures

Table 1 contains pseudocode representations of the condvarWait, condvarTimedWait, condvarNotify and condvarNotifyAll software routines relevant to the present invention. The pseudocode used in Table 1 utilizes universal computer language conventions. While the pseudocode employed here has been invented solely for the purposes of this description, it is designed to be easily understandable by any computer programmer skilled in the art.

Figure 4:
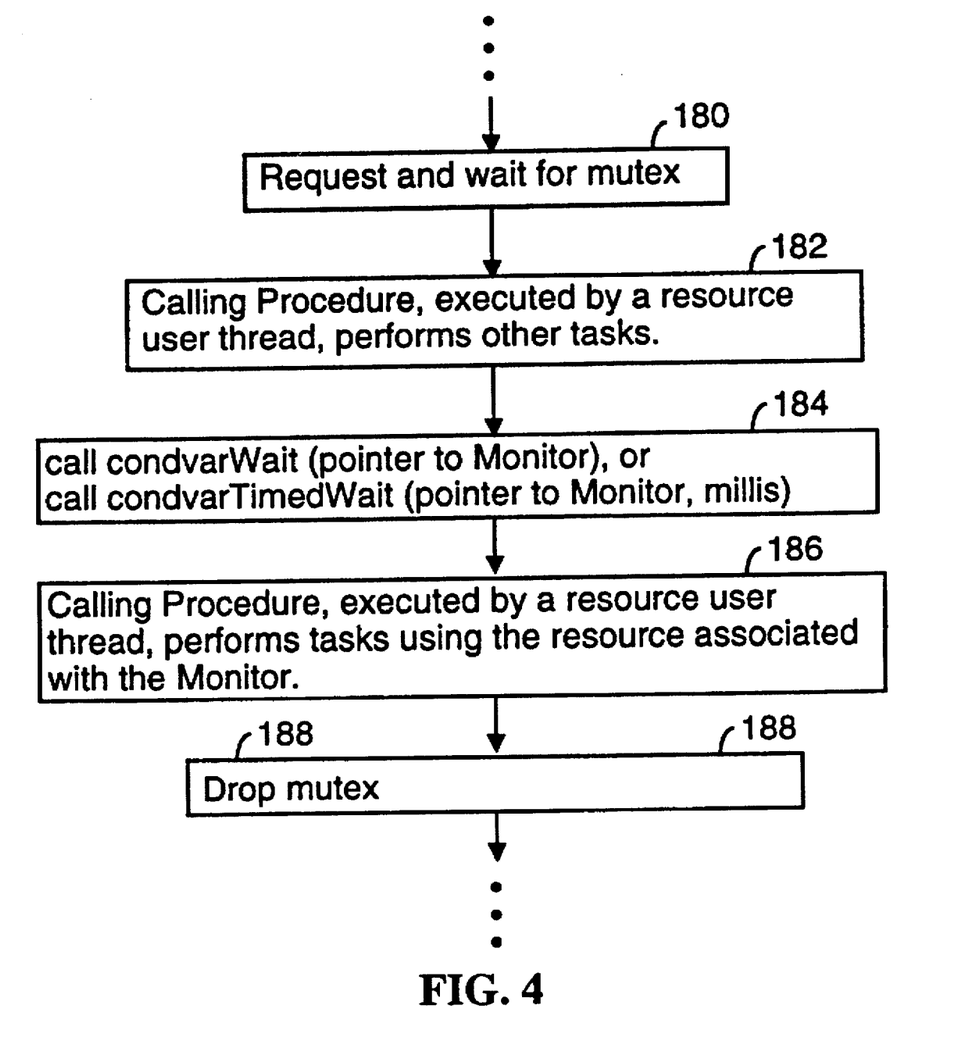
FIG. 4 is a flow chart of an exemplary procedure, executed by a resource user thread, that calls one of the wait until notification procedures provided by a preferred embodiment of the present invention.

Referring to FIGS. 3 and 4, and Table 1, the function of each of the monitor object's components is as follows:

mutex 124 is used to synchronize each ceiling thread with the monitor object. Mutexes are a primitive object provided by the operating system. Only one thread can a "own" a mutex at a time. All other threads requesting a mutex are called "waiters" and are listed on the mutex's waiters list;

condvar.Waiters 126 represents the number of threads waiting to be notified;

condvar.Counter 128 is an "epoch" value in that it is incremented every time the monitor's event object is Signaled;

condvar.Tickets 130 represents the number of threads to be notified that the associated event object has been Signaled; and condvar.Event 132, which is a object handle for an associated event object 134.

The number of threads that are blocked on a particular monitor is equal to condvar.Waiters. When the monitor's event object is Signaled, condvar.Tickets is set to the number of the threads to be notified. When the condvarNotify procedure is used to signal the event object, just one "ticket" is issued. When the condvarNotifyAll procedure is used to signal the event object, enough "tickets" are issued to enable notification of all the waiting threads.

As will be explained in more detail below, the only use of the condvar.Counter variable 128 is to ensure that a waiting thread is not unblocked by a notification that occurred prior to when the waiting thread began waiting.

FIG. 4 shows an exemplary procedure, executed by a resource user thread, that calls one of the "wait until notification" procedures provided by the preferred embodiment of the present invention. In particular, prior to calling the Wait or TimedWait procedure, the calling thread will acquire ownership of the monitor associated with the resource to be used (180). For the purposes of this document, acquiring ownership of a monitor and acquiring ownership of a monitor's mutex are assumed to be the same thing. After acquiring ownership of the monitor, the calling thread may optionally perform various tasks requiring ownership of the monitor (182) prior to invoking (184) the Wait or TimedWait procedure. As described in more detail below, the Wait procedure 106 and TimedWait procedure 108 both perform the function of dropping ownership of the monitor and initiating a wait until the monitor becomes Signaled as an atomic operation. When the Wait or TimedWait procedure returns, the calling thread has ownership of the monitor and will typically perform various tasks using the resource associated with the monitor (186), unless the TimedWait procedure returned due to a timeout, prior to dropping ownership of the monitor (188).

Generally, the threads of execution that perform the Wait procedures and Notify procedures discussed below must have ownership of the specified monitor's mutex before testing or modifying the values stored by the monitor. All threads that share use of a resource and its associated monitor synchronize with each other via the monitor's mutex to prevent the values stored by the monitor from being changed by one thread while another thread is using them.

Figure 5:
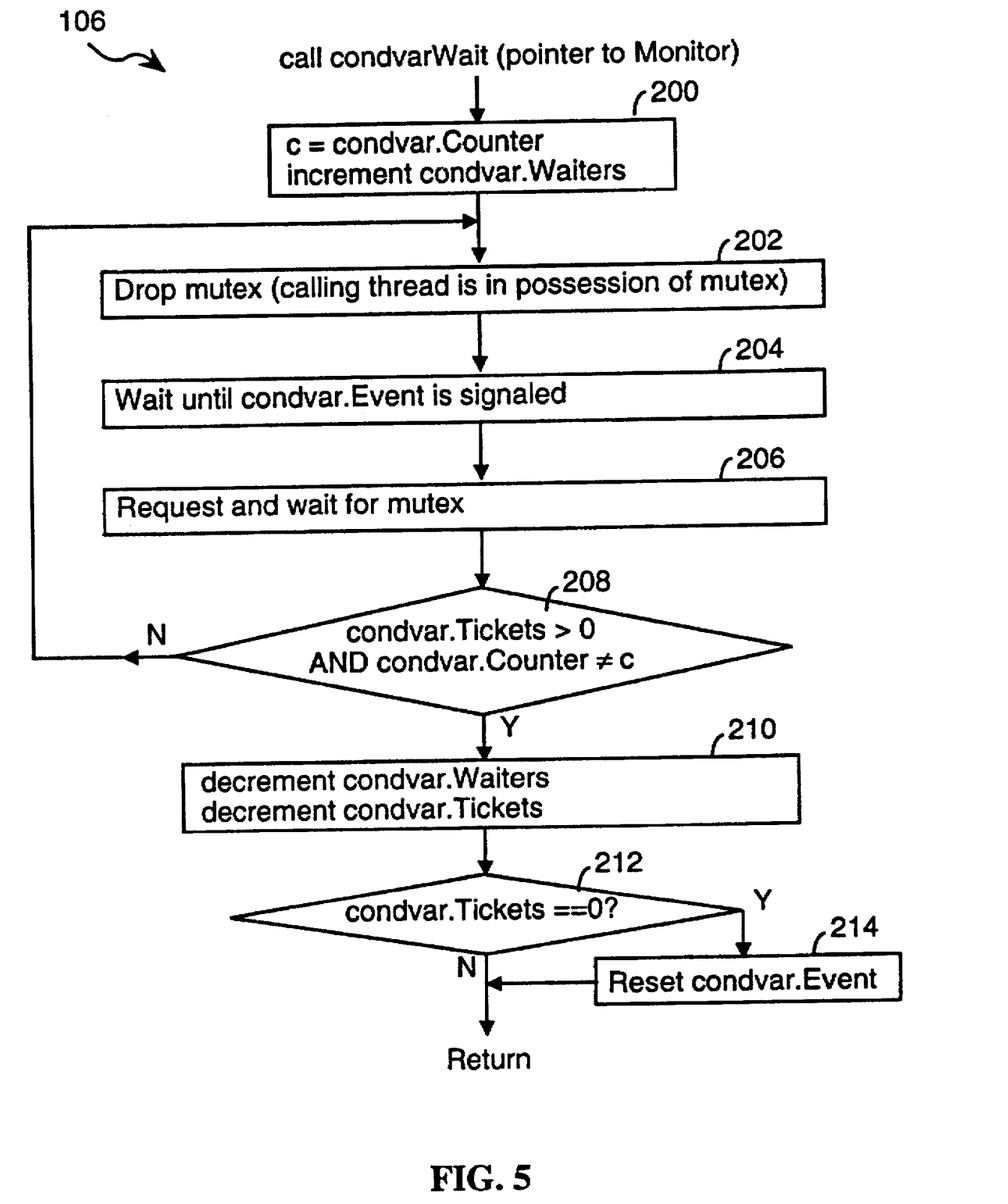
FIG. 5 is a flow chart of a "wait until notification" procedure used in a preferred embodiment of the present invention.

Referring to FIG. 5 and Table 1, when the Wait procedure (called condvarWait) is called by a thread, the procedure call indicates the monitor object that the thread is to be synchronized with. As explained above, the specified monitor includes a mutex, a condition variable data structure, and an event object.

The Wait procedure 106 begins by storing the current epoch value, represented by condvar.Counter in a variable "c", and by incrementing the specified monitor's waiters value, condvar.Waiters (200). Incrementing the condvar.Waiters value indicates that the number of threads waiting on the specified monitor has increased by one.

Next, the Wait procedure executes a loop having three steps 202, 204, 206, until a loop exit condition at step 208 is satisfied. First, the Wait procedure drops the mutex (202). Then it waits until the event object pointed to by condvar.Event has a status of Signaled (204). For the purposes of this document, a monitor object is considered have a status of Signaled when its event object has a status of Signaled. As will be described below, the Notify and NotifyAll procedures are used to set a specified monitor's status to Signaled, as well as to set the number of notification tickets to a non-zero value. After the monitor object has a status of Signaled, the Wait procedure waits until it acquires the mutex in the specified monitor (206).

At step 208, after acquiring the mutex for the specified monitor, the Wait procedure determines whether the number of outstanding notification tickets, condvar.Tickets, is greater than zero, and whether the current notification epoch, condvar.Counter, is distinct from the starting epoch value, c, when the calling thread called the wait procedure. If the current epoch value, condvar.Counter is the same as the starting epoch value, this indicates that the monitor was last signaled before the calling thread called the Wait procedure. Since the purpose of the Wait procedure is to wait for a notification that takes place after the Wait procedure is called, the calling thread must not be unblocked by a notification that took place before the calling thread called the Wait procedure.

If either of the determinations in step 208 is negative (i.e., the notification epoch has not changed since the Wait procedure was called, or the number of available notification tickets is zero), execution resumes at the beginning of the loop at step 202. Otherwise (208-Y), the calling thread "consumes" one of the outstanding notification tickets by decrementing condvar.Waiters and condvar.Tickets (210). Then, if the remaining number of notification tickets is zero (212) the event object associated with the specified monitor is reset to a status of Unsignaled (214). Finally the Wait procedure returns, unblocking the calling thread (i.e., allowing the calling thread to resume execution of other procedures).

It is noted here that it is important for the Wait procedure to drop ownership of the mutex during each execution of the wait loop, 202, 204, 206, so that other threads have the opportunity to acquire the mutex and to then access and modify the information in the specified monitor.

Figure 6:
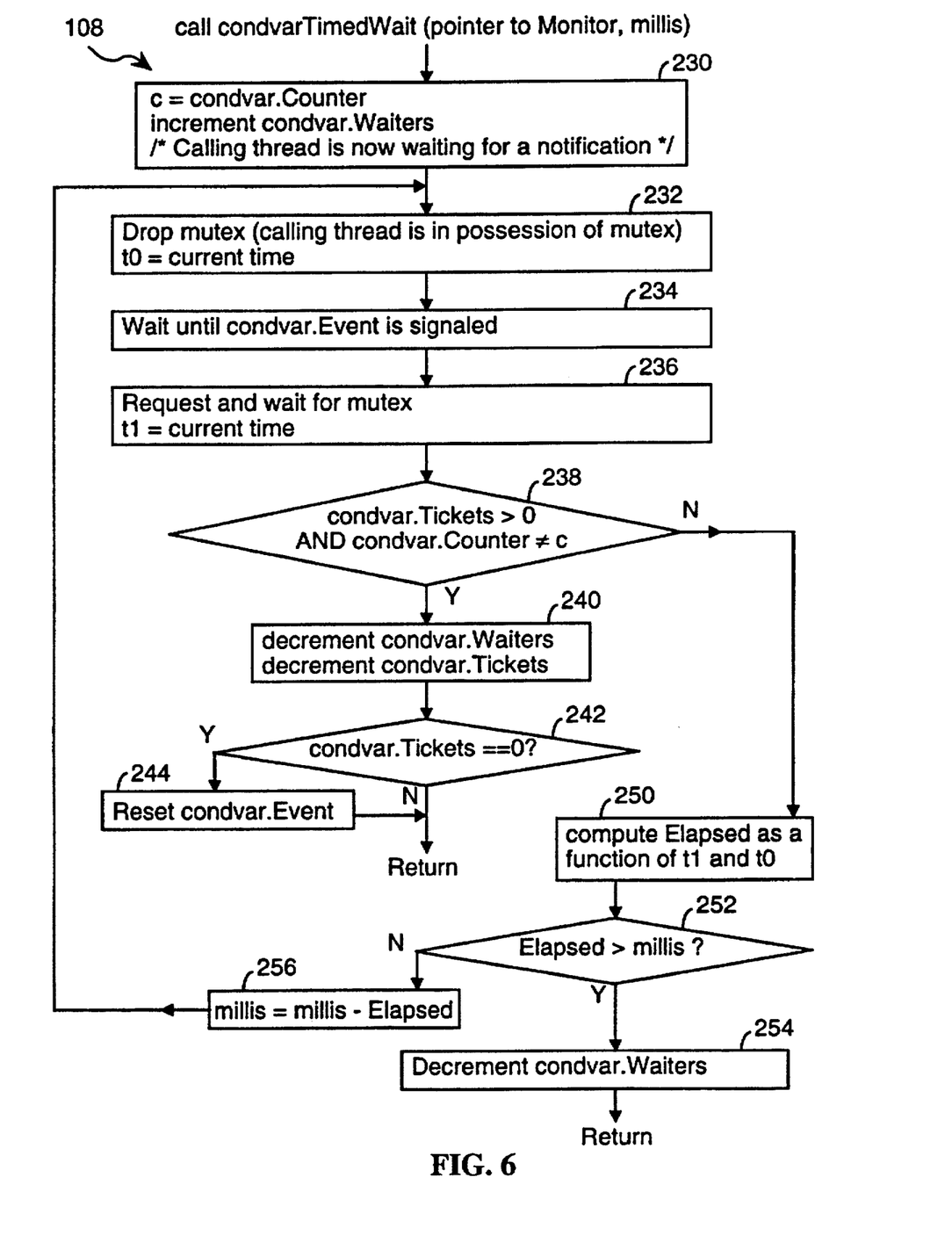
FIG. 6 is a flow chart of a "wait until notification or timeout" procedure used in a preferred embodiment of the present invention.

Referring to FIG. 6 and Table 1, the TimedWait procedure 108 (called condvarTimedWait in the figures and Table 1) is very similar to the Wait procedure of FIG. 5, except that the calling thread is unblocked by either consumption of a notification ticket, or by the expiration of a specified time period, "millis". The system's CPU 150 (see FIG. 2) includes a clock generator (not shown), or the operating system 154 includes a clock procedure (not shown), for maintaining accurate current date and time values. These time values are used by the TimedWait procedure to determine whether a timeout has occurred.

The TimedWait procedure 108 begins by storing the current epoch value, represented by condvar.Counter in a variable "c", and by incrementing the specified monitor's waiters value, condvar.Waiters (230). Next, the TimedWait procedure executes a loop of instructions until either a loop exit condition at step 238 is satisfied, or a timeout condition at step 252 is satisfied. At step 232, calling thread drops ownership of the specified monitor's mutex, and it also stores the current system time in a variable called t0. Then it waits until the specified monitor object has a status of Signaled (234). After the monitor object has a status of Signaled, the TimedWait procedure waits until it acquires the mutex in the specified monitor, after which it stores the current system time in a variable called t1 (236).

At step 238, after acquiring the mutex for the specified monitor, the TimedWait procedure determines whether the number of outstanding notification tickets, condvar.Tickets, is greater than zero, and whether the current notification epoch, condvar.Counter, is distinct from the starting epoch value, c, when the calling thread called the wait procedure. If both of the determinations at step 238 are positive (238-Y), one of the outstanding notification tickets is "consumed" on behalf of the calling thread by decrementing both condvar.Waiters and condvar.Tickets (240). Then, if the remaining number of notification tickets is zero (242) the event object associated with the specified monitor is reset to a status of Unsignaled (244) and the TimedWait procedure returns, unblocking the calling thread (i.e., allowing the calling thread to resume execution of other procedures).

However, if either of the determinations in step 238 is negative (i.e., the notification epoch has not changed since the Wait procedure was called, or the number of available tickets is zero), the TimedWait procedure next determines if a timeout has occurred. At step 250 the elapsed time (Elapsed) while the calling thread was waiting for the monitor to be Signaled and then to acquire the mutex is computed, and at step 252 the computed elapsed time is compared with the amount of time remaining for a timeout. If the specified time period has expired (252-Y), which is called a timeout, condvar.Waiters is decremented to indicate that the calling thread is no longer waiting for a notification (254). Then the TimedWait procedure returns, thereby unblocking the calling thread.

Figure 7:
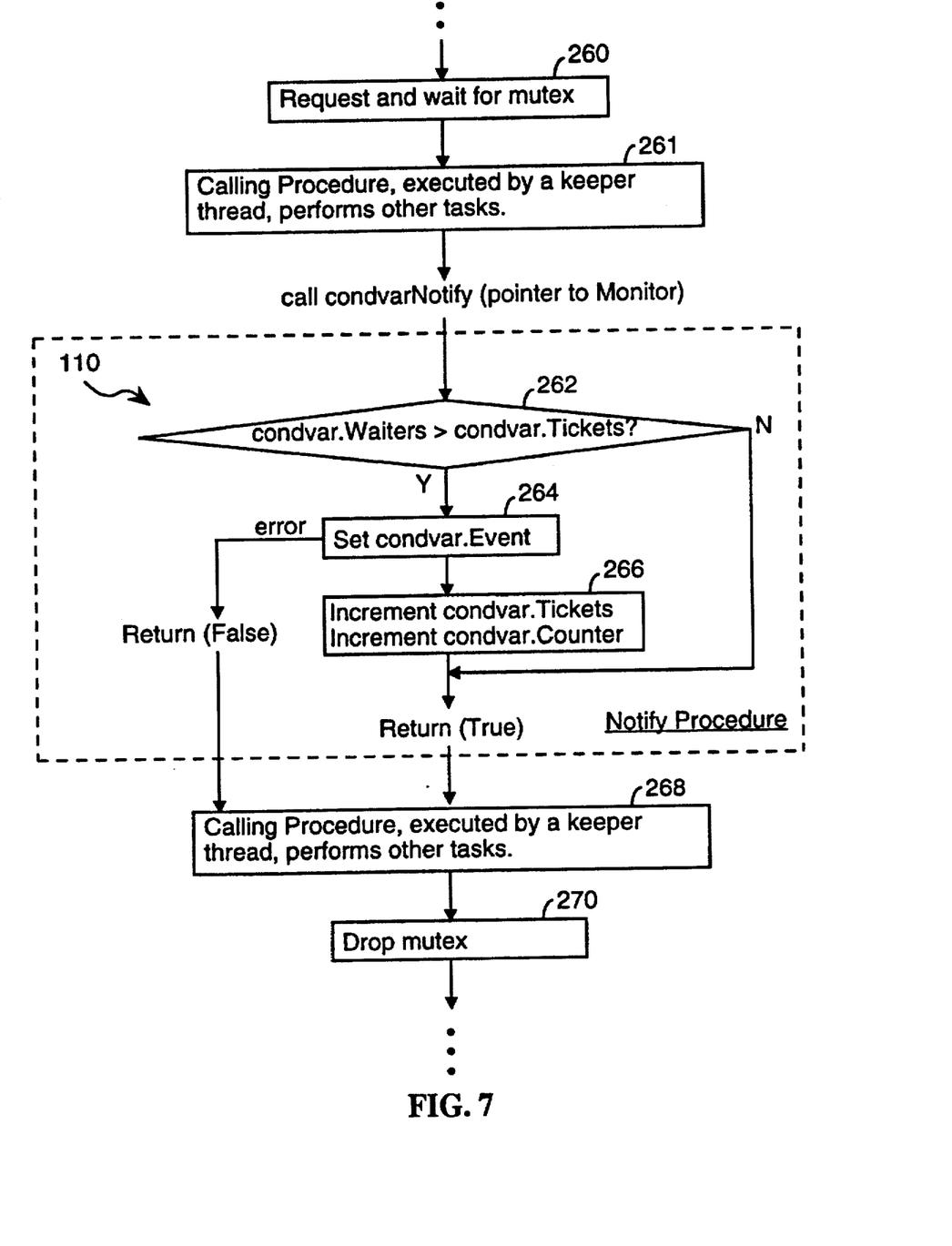
FIG. 7 is a flow chart of a "notify one waiting thread" procedure used in a preferred embodiment of the present invention.

Referring to FIG. 7 and Table 1, the purpose of the Notify procedure (called condvarNotify in the figures and Table 1) is to issue one notification ticket if there are more threads waiting on the specified monitor than there are outstanding notification tickets. Prior to calling the Notify procedure, the calling keeper thread will acquire the mutex for the monitor associated with the resource being managed by the keeper thread (260), and may also perform various other tasks (261) that require ownership of the monitor prior to calling the Notify procedure.

The Notify procedure initially determines whether there are more waiting threads, condvar.Waiters, than there are outstanding notification tickets, condvar.Tickets (262). If not (262-N), the procedure immediately returns to the calling procedure. If the determination at step 262 is positive, the event object associated with the specified monitor object is "set" so as to changed its status (and the status of the monitor object) to Signaled (264). If the setting of the event object's status is unsuccessful (e.g., if the event object doesn't exist), the procedure exits with an error indication. Otherwise, condvar.Tickets is incremented so as to increase the number of outstanding notification tickets by one, and the notification epoch condvar.Counter is incremented so as to indicate that a new notification has occurred (266). Then the Notify procedure returns. After completion of the Notify procedure, the calling thread may perform various other tasks (268) requiring ownership of the monitor prior to dropping ownership of the mutex for the specified monitor (270).

Figure 8:
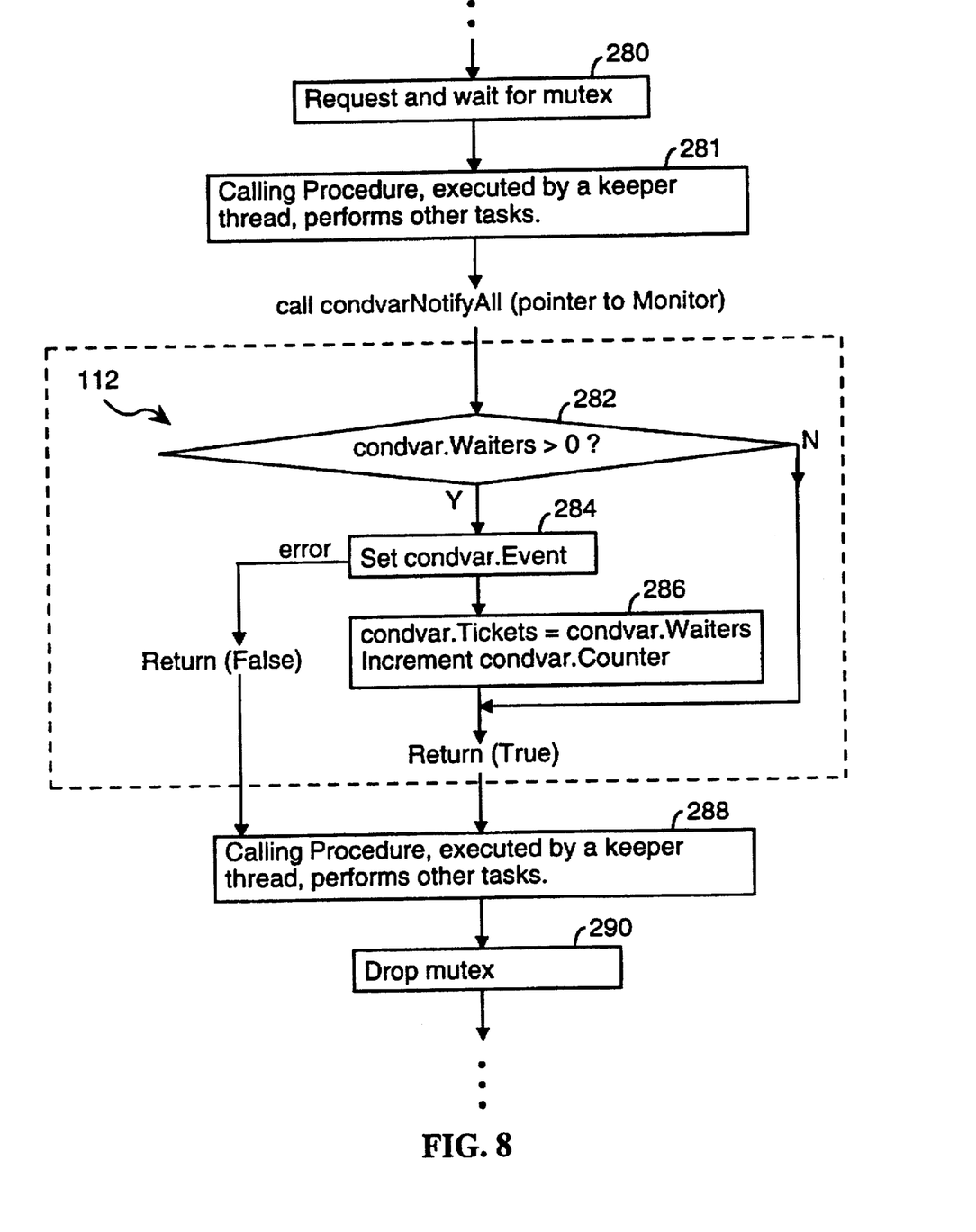
FIG. 8 is a flow chart of a "notify all waiting threads" procedure used in a preferred embodiment of the present invention.

Referring to FIG. 8 and Table 1, the NotifyAll procedure (called condvarNotifyAll in the figures and Table 1) is similar to the Notify procedure except that notification tickets are issued for all waiting threads. Prior to calling the NotifyAll procedure, the calling keeper thread will acquire the mutex for the monitor associated with the resource being managed by the keeper thread (280), and may also perform various other tasks (281) that require ownership of the monitor prior to calling the Notify procedure.

The NotifyAll procedure begins by determining if there any waiting threads (282). If not (282-N), the procedure immediately returns to the calling procedure. If there are any waiting threads (282-Y), then the event object associated with the specified monitor object is "set" so as to changed its status (and the status of the monitor object) to Signaled (284). If the setting of the event object's status is unsuccessful (e.g., if the event object doesn't exist), the procedure exits with an error indication. Otherwise, condvar.Tickets is set equal to the number of waiting threads, condvar.Waiters, and the notification epoch condvar.Counter is incremented so as to indicate that a new notification has occurred (286). Then the NotifyAll procedure returns. After completion of the NotifyAll procedure, the calling thread may perform various other tasks (288) requiring ownership of the monitor prior to dropping ownership of the mutex for the specified monitor (290).

In an alternate implementation, step 282 in the NotifyAll procedure determines whether there are more waiting threads, condvar.Waiters, than there are outstanding notification tickets, condvar.Tickets.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Wait and Notify Procedures

```
Struct monitor   {
    mutex
    condvar
    }
Struct condvar   {
    int waiters;     /*  waiters represents the number of threads waiting to
                         be notified  */
    int counter;     /*  current number of notifications  */
    int tickets;     /*  the number of threads that are currently notified  */
    handle event     /*  an event object, which gets signaled when an event
                         occurs *
    }
Procedure: condvarWait (pointer to Monitor)
    /*  Drop Monitor and Block on a condition variable until signaled.
        It is assumed that the caller thread already has ownership of the
        specified monitor before calling the Wait procedure.
        "condvar" is the condition variable on which the calling thread is
            blocked.
        "mutex" is the mutex associated with the condition variable.
    */
    {
    /*  save current counter value to make sure we don't respond to
        notifications that occurred before we started waiting  */
    c = condvar.Counter
    increment condvar.Waiters
    do while (True)
        {
        Drop mutex       /*  calling thread already has possession of the
                             mutex (i.e., the specified monitor)  */
        Wait until condvar.Event is signaled
        Acquire mutex    /*  this causes the calling thread to stall until it gets
                             possession of the thread*/
        /*  The loop repeats if condvar is still equal to c, regardless of
            number of tickets that are outstanding. This prevents the calling
            thread from responding to a notification that occurred prior to it
            executed this wait procedure.  */
        If condvar.Tickets > 0 AND condvar.Counter ≠ c
```

TABLE 1-continued

Pseudocode Representation of Wait and Notify Procedures

```
        {
        /* since the calling thread is no longer a waiter, the waiters
            value is decreased by 1    */
        decrement condvar.Waiters
        /* since the call thread is "consuming" one ticket, by
            accepting the event notification, the tickets value is also
            decreased by 1    */
        decrement condvar.Tickets
        /* If this was the last thread to be notified, then we need to
            reset the event object.    */
        If condvar.Tickets == 0
            {  Reset condvar.Event    }
        Return
        }
    }   /* End of Do loop    */
  }   /* End of Wait procedure    */
Procedure: condvarTimedWait (pointer to monitor)
    /* Block on a condition variable until signaled or a timeout has expired.
        It is assumed that the caller thread already has ownership of the
        specified monitor before calling the TimedWait procedure.
        "condvar" is the condition variable on which the calling tread is
            blocked.
        "mutex" is the mutex associated with the condition variable.
        "millis" is the duration of the timeout.
    */
    {
    c = condvar.Counter
    increment condvar.Waiters
    do while (True)
        {
        Drop mutex
        t0 = current time
        Wait until condvar.Event is signaled, or until timeout(millis)
        Acquire mutex
        t1 = current time
        If condvar.Tickets > 0 AND condvar.Counter ≠ c
            {
            decrement condvar.Waiters
            decrement condvar.Tickets
            If condvar.Tickets == 0
                {  Reset condvar.Event    }
            Return
            }
        /* Need to check for wraparound of elapsed time    */
        If t1 > t0
            {  elapsed = t1 − t0    }
        Else
            {  elapsed = ULONG_MAX − t1 + t0    }
        /* Check for timeout    */
        If elapsed > millis
            {
            Decrement condvar.Waiters
            Return
            }
        millis = millis − elapsed
        }   /* end of Do loop    */
    }
/* Notify single thread waiting on a condition variable    */
Procedure: condvarNotify (pointer to monitor)
    {
    /* Calling thread must have acquired monitor before calling Notify
        procedure    */
    If condvar.Waiters > condvar.Tickets
        {
        set condvar.Event
        If condvar.Event is not set
            {  Return False    }
        Increment condvar.Tickets
        increment condvar.Counter
        }
    Return True
    /* Calling thread will drop monitor after finishing any other tasks
        requiring ownership of the monitor    */
    }
/* Notify all threads waiting on a condition variable    */
Procedure: condvarNotifyAll (pointer to monitor)
    {
```

TABLE 1-continued

Pseudocode Representation of Wait and Notify Procedures

```
/*   Calling thread must have acquired monitor before calling Notify
     procedure  */
If condvar.Waiters > 0
    {
    set condvar.Event
    If condvar.Event is not set
        {   Return False   }
    condvar.Tickets = condvar.Waiters
    increment condvar.Counter
    }
Return True
/*   Calling thread will drop monitor after finishing any other tasks
     requiring ownership of the monitor   */
}
```

What is claimed is:

1. In a computer system having a data processing unit, memory, and a multitasking operating system that supports multiple threads of execution in a shared address space, a resource allocation subsystem comprising:

an initialization procedure, executable by said data processing unit, for initializing monitors, where each monitor is stored in said memory and has an associated event data structure denoting the status of said monitor as Signaled or Unsignaled, each monitor further storing epoch information;

a notify procedure, executable by said data processing unit, for updating any specified one of said monitors to said Signaled status and for updating said epoch information to indicate an epoch value associated with said updating of said specified monitor's status to Signaled; and a wait procedure, executable by said data processing unit, for blocking execution of any calling thread of execution until a specified monitor's status is updated to Signaled and said specified monitor's epoch information indicates an epoch value distinct from a starting epoch value comprising said epoch value when said calling thread of execution called said wait procedure.

2. The resource allocation subsystem of claim 1, said wait procedure including instructions for releasing ownership of said specified monitor and performing said execution blocking as an atomic operation.

3. The resource allocation subsystem of claim 2, each monitor further storing waiters information indicating how many threads are waiting on said monitor, and tickets information indicating how many of said waiting threads are to receive notifications;

said notify procedure further for updating said specified monitor's tickets information to indicate that a number of threads are to receive notifications, where said number of threads is at least one; and said wait procedure further includes instructions for checking said specified monitor's tickets information when specified monitors status is updated to Signaled and said specified monitor's epoch information indicates an epoch value distinct from said starting epoch value, for unblocking said calling thread of execution when said checked tickets information indicates a non-zero tickets value and for decrementing said tickets value to indicate that said calling thread of execution has consumed one ticket associated with said associated monitor.

4. The resource allocation subsystem of claim 1, each monitor further storing a waiters value indicating how many threads are waiting on said monitor, and a tickets value indicating how many of said waiting threads are to receive notifications;

said notify procedure further for increasing said specified monitor's tickets value by one to indicate that one additional thread is to receive a notification;

said wait procedure further includes instructions for checking said specified monitor's tickets value when specified monitor's status is updated to Signaled and said specified monitor's epoch information indicates an epoch value distinct from said epoch value when said calling thread of execution called said wait procedure, for unblocking said calling thread of execution when said tickets value is non-zero and for decrementing said tickets value to indicate that said calling thread of execution has consumed one ticket associated with said specified monitor;

further including:

a second notify procedure, executable by said data processing unit, for updating any specified one of said monitors to said Signaled status, for updating said epoch information to indicate an epoch value associated with said updating of said specified monitor's status to Signaled, and for setting said specified monitor's tickets value to said waiters value so as to indicate that all waiting threads are to receive notifications.

5. The resource allocation subsystem of claim 4, further including:

a timed wait procedure, executable by said data processing unit, for blocking execution of any calling thread of execution until (A) a specified time elapses or (B) a specified monitor's status is updated to Signaled and said specified monitor's epoch information indicates an epoch value distinct from said epoch value when said calling thread of execution called said timed wait procedure;

said timed wait procedure including instructions for checking said specified monitor's tickets value when specified monitor's status is updated to Signaled and said specified monitor's epoch information indicates an epoch value distinct from said epoch Value when said calling thread of execution called said timed wait procedure, for unblocking said calling thread of execution when said tickets value is non-zero and for decrementing said tickets value to indicate that said calling thread of execution has consumed one ticket associated with said specified monitor.

6. In a computer system having a data processing unit, memory, and a multitasking operating system that supports multiple threads of execution in a shared address space, a resource allocation subsystem comprising:

an initialization procedure for initializing monitors, where each monitor is stored in said memory and has an associated event data structure denoting the status of said monitor as Signaled or Unsignaled, each monitor further storing waiters information indicating how many threads are waiting on said monitor, tickets information indicating how many of said waiting threads are to receive notifications, and epoch information;

a notify procedure for updating any specified one of said monitors to said Signaled status and for updating said specified monitor's tickets information to indicate that a number of threads are to receive notifications, where said number of threads is at least one, and for updating said epoch information to indicate an epoch value associated with said updating of said specified monitor's status to Signaled;

a wait procedure, executable by said data processing unit, for blocking execution of a calling thread of execution until a specified monitors status is updated to Signaled, said specified monitor's epoch information indicates an epoch value distinct from said epoch value when said calling thread called said wait procedure, and said tickets information indicates a non-zero tickets value, and for decrementing said tickets value to indicate that said calling thread of execution has consumed one ticket associated with said specified monitor.

7. The resource allocation subsystem of claim 6, said wait procedure including instructions for releasing ownership of said specified monitor and performing said execution blocking as an atomic operation.

8. In a computer system having a data processing unit, memory, and a multitasking operating system that supports multiple threads of execution in a shared address space, a method of operating the computer system, comprising the steps of:

providing at least one monitor, stored in said memory, that has an associated event data structure denoting the status of said monitor as Signaled or Unsignaled, each monitor further storing epoch information;

performing a notify operation on any specified one of said monitors by updating said specified monitor to said Signaled status and updating said specified monitor's epoch information to indicate an epoch value associated with said updating of said specified monitor's status to Signaled; and performing a wait operation by blocking execution of any calling thread of execution until a specified monitor's status is updated to Signaled and said specified monitor's epoch information indicates an epoch value distinct from a starting epoch value comprising said epoch value when said calling thread of execution began performing said wait operation.

9. The method of claim 8, said step of performing a wait operation including releasing ownership of said specified monitor and performing said execution blocking as an atomic operation.

10. The method of claim 9, each monitor further storing waiters information indicating how many threads are waiting on said monitor, and tickets information indicating how many of said waiting threads are to receive notifications;

said step or performing a notify operation including updating said specified monitor's tickets information to indicate that a number of threads are to receive notifications, where said number of threads is at least one; and said set of performing a wait operation including checking said specified monitor's tickets information when said specified monitor's status is updated to Signaled and said specified monitor's epoch information indicates an epoch value distinct from said starting epoch value, unblocking said calling thread of execution when said checked tickets information indicates a non-zero tickets value, and decrementing said tickets value to indicate that said calling thread of execution has consumed one ticket associated with said associated monitor.

11. The method of claim 8, each monitor further storing a waiters value indicating how many threads are waiting on said monitor, and a tickets value indicating how many of said waiting threads are to receive notifications;

said step of performing a notify operation including increasing said specified monitors tickets value by one to indicate that one additional thread is to receive a notification;

said step of performing a wait operation including checking said specified monitor's tickets value when specified monitor's status is updated to Signaled and said specified monitor's epoch information indicates an epoch value distinct from said starting epoch value, unblocking said calling thread of execution when said tickets value is non-zero, and decrementing said tickets value to indicate that said calling thread of execution has consumed one ticket associated with said specified monitor;

further including:

performing a second notify operation by updating any specified one of said monitors to said Signaled status, updating said epoch information to indicate an epoch value associated with said updating of said specified monitor's status to Signaled, and setting said specified monitors tickets value to said waiters value so as to indicate that all waiting threads are to receive notifications.

12. The method of claim 11, further including:

performing a timed wait operation by blocking execution of any calling thread of execution until (A) a specified time elapses or (B) a specified monitor's status is updated to Signaled and said specified monitors epoch information indicates an epoch value distinct from said starting epoch value;

said step of performing a timed wait operation including checking said specified monitor's tickets value when specified monitor's status is updated to Signaled and said specified monitors epoch information indicates an epoch value distinct from said starting epoch value, unblocking said calling thread of execution when said tickets value is non-zero, and decrementing said tickets value to indicate that said calling thread of execution has consumed one ticket associated with said specified monitor.

13. In a computer system having a data processing unit, memory, and a multitasking operating system that supports multiple threads of execution in a shared address space, a method of operating the computer system, comprising the steps of:

providing at least one monitor, stored in said memory, that has an associated event data structure denoting the status of said monitor as Signaled or Unsignaled, each monitor further storing waiters information indicating how many threads are waiting on said monitor, tickets information indicating how many of said waiting threads are to receive notifications, and epoch information;

performing a notify operation on any specified one of said monitors by updating said specified monitor to said Signaled status, updating said specified monitors epoch information to indicate an epoch value associated with said updating of said specified monitor's status to Signaled, and updating said specified monitor's tickets information to indicate that a number of threads are to receive notifications, where said number of threads is at least one; and performing a wait operation by blocking execution of any calling thread of execution until a specified monitor's status is updated to Signaled, said specified monitor's epoch information indicates an epoch value distinct from a starting epoch value comprising said epoch value when said calling thread of execution began performing said wait operation, and said tickets information indicates a non-zero tickets value, and then decrementing said tickets value to indicate that said calling thread of execution has consumed one ticket associated with said specified monitor.

14. The method of claim 13, said step of performing a wait operation including releasing ownership of said specified monitor and performing said execution blocking as an atomic operation.

\* \* \* \* \*